(12) United States Patent
Hildebrand et al.

(10) Patent No.: US 9,535,922 B2
(45) Date of Patent: *Jan. 3, 2017

(54) DISK IMAGE INTROSPECTION FOR STORAGE SYSTEMS

(71) Applicant: INTERNATIONAL BUSINESS MACHINES CORPORATION, Armonk, NY (US)

(72) Inventors: Dean Hildebrand, San Jose, CA (US); Renu Tewari, San Jose, CA (US); Vasily Tarasov, Stony Brook, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/951,275

(22) Filed: Nov. 24, 2015

(65) Prior Publication Data
US 2016/0078049 A1    Mar. 17, 2016

Related U.S. Application Data

(63) Continuation of application No. 13/098,317, filed on Apr. 29, 2011.

(51) Int. Cl.
*G06F 17/30* (2006.01)
*G06F 9/455* (2006.01)

(52) U.S. Cl.
CPC ..... *G06F 17/30132* (2013.01); *G06F 9/45558* (2013.01); *G06F 17/30233* (2013.01); *G06F 2009/45583* (2013.01)

(58) Field of Classification Search
CPC .................. G06F 17/30238; G06F 17/30115
See application file for complete search history.

(56) References Cited

U.S. PATENT DOCUMENTS

| | | | |
|---|---|---|---|
| 7,016,982 B2 | 3/2006 | Basham | |
| 7,203,815 B2 | 4/2007 | Haswell | |
| 7,213,113 B2 | 5/2007 | Sahin et al. | |
| 8,290,994 B2 | 10/2012 | Allalouf et al. | |
| 2003/0212700 A1* | 11/2003 | Basham | G06F 3/0613 |
| 2009/0150998 A1 | 6/2009 | Adelstein et al. | |
| 2009/0271589 A1 | 10/2009 | Karpoff et al. | |
| 2010/0169881 A1 | 7/2010 | Silvera et al. | |
| 2010/0241654 A1 | 9/2010 | Wu et al. | |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Syed Hasan
(74) *Attorney, Agent, or Firm* — Sherman IP LLP; Kenneth L. Sherman; Steven Laut

(57) ABSTRACT

A method for disk image access in a storage system includes prefetching a disk image metadata structure. An input/output (I/O) request to the disk image is received. In response to the I/O request, a file system request is reconstructed by laying out the disk image, performing type-specific introspection on the disk image, and mapping data ranges in the disk image to blocks or files within the file system based on results of the introspection.

20 Claims, 7 Drawing Sheets

(56) References Cited

OTHER PUBLICATIONS

U.S. Non-Final Office Action for U.S. Appl. No. 13/098,317 mailed May 29, 2013.
U.S. Final Office Action for U.S. Appl. No. 13/098,317 mailed Nov. 20, 2013.
U.S. Advisory Action for U.S. Appl. No. 13/098,317 mailed Feb. 18, 2014.
U.S. Non-Final Office Action for U.S. Appl. No. 13/098,317 mailed Sep. 25, 2014.
U.S. Final Office Action for U.S. Appl. No. 13/098,317 mailed Feb. 26, 2015.
U.S. Non-Final Office Action for U.S. Appl. No. 13/098,317 mailed May 15, 2015.
U.S. Notice of Allowance for U.S. Appl. No. 13/098,317 mailed Sep. 10, 2015.

* cited by examiner

DISK IMAGE INTROSPECTION FOR STORAGE SYSTEMS

BACKGROUND

The present invention related generally to file systems, and in particular, to virtual machine disk image introspection for storage systems.

Virtual machines in information technology systems often generate input/output (I/O) workloads that comprise small requests with random addresses. Therefore, from the point of performance, streaming throughput is less important than the number of I/O requests per second (IOPS). IOPS intensive workloads are typically highly sensitive to latency. Further, virtual machines perform I/O to disk images, which are effectively file representations of real disks. A disk image can thus be formatted as any guest file system (e.g., EXT3, XFS, NTFS), or any other higher-level structure such as a database (DB). The disk image is stored in a server file system (e.g., GPFS, NFS, EXT3, VMFS, iSCSI) and operations to the disk image are handled by treating the disk image as a typical operating system file. A server file system attempts to optimize I/O requests to the disk image file system without useful knowledge about the structure of the disk image content, resulting in suboptimal I/O latency and throughput. Further, original file system requests are lost, replaced with less predictable I/O requests. This causes data and metadata caching problems and disk layout alignment issues, wherein I/O request to a single block in a misaligned disk image causes two server blocks to be accessed at the server file system.

SUMMARY

Embodiments of the invention enhance disk image access in a storage system. In one embodiment, a method of providing virtual machine disk image access in a storage system includes prefetching a disk image metadata structure. An input/output (I/O) request to the disk image is received. In response to the I/O request, a file system request is reconstructed by laying out the disk image, performing type-specific introspection on the disk image, and mapping data ranges in the disk image to blocks or files within the file system based on results of the introspection.

Other aspects and advantages of the present invention will become apparent from the following detailed description, which, when taken in conjunction with the drawings, illustrate by way of example the principles of the invention.

DETAILED DESCRIPTION

Figure 1:
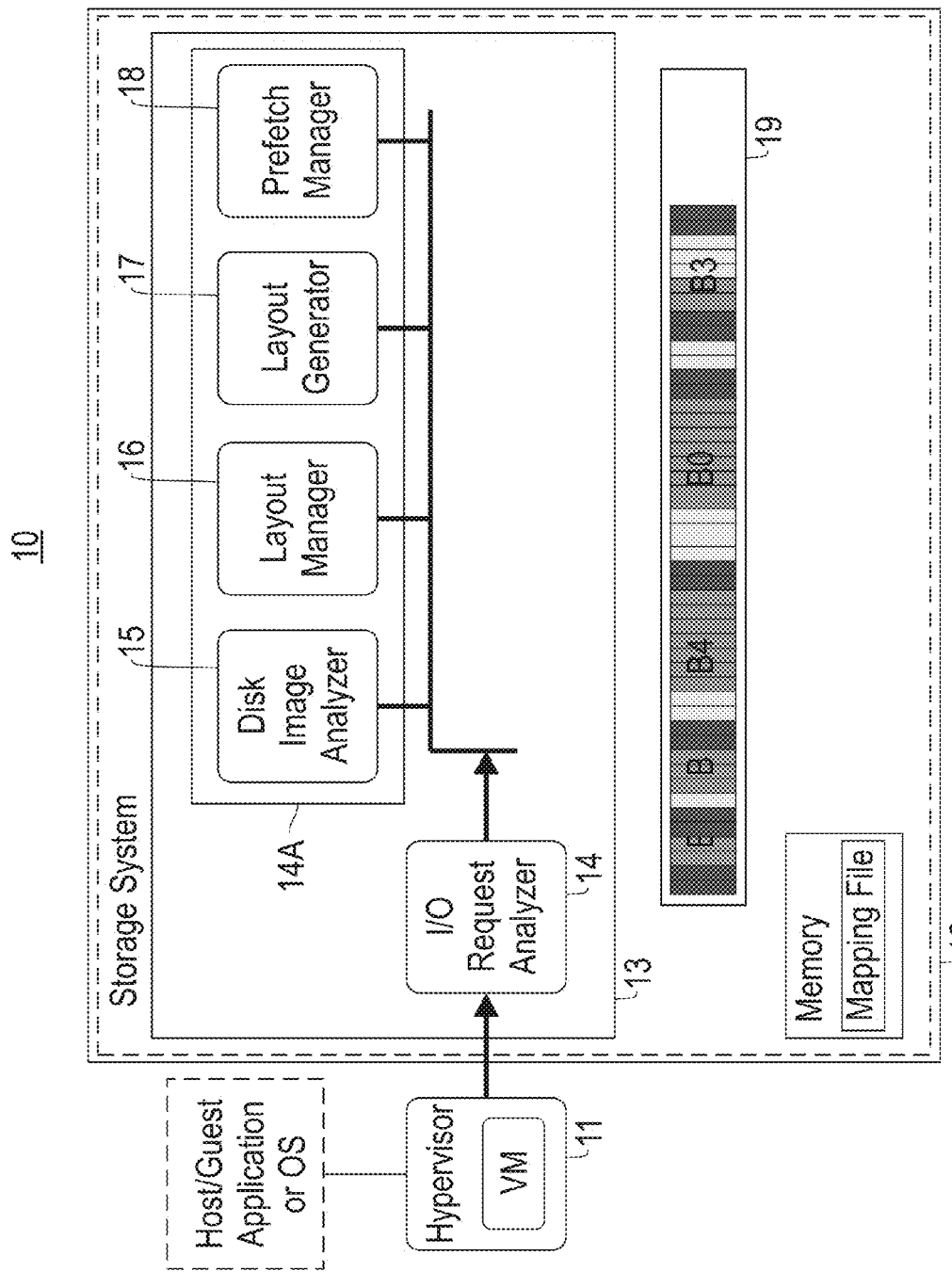
FIG. 1 shows a block diagram of an information technology system and components for disk image introspection for a storage system, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for file systems, as well as operation and/or component parts thereof. While the following description will be described in terms of file systems and processes for clarity and placing the invention in context, it should be kept in mind that the teachings herein may have broad application to all types of systems, devices and applications.

Embodiments of the invention provide disk image introspection for storage systems in information technology systems such as for cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Embodiments of the invention provide introspecting a disk image in a storage system for optimizing data access operations on the disk image. In one embodiment, the invention provides a system implementing a method for introspecting and analyzing a disk image in the storage system for identifying a file system of the disk image.

According to embodiments of the invention, a mapping of data ranges in a disk image file system (i.e., guest file system) to block or files within a storage server file system (i.e., server file system of a storage system) is maintained. Information about storage server disk image type is used to transform storage server file system (i.e., server) requests to guest (or host) file system requests. Whenever a write occurs on the disk image, the mapping is updated. Read/write requests (for the disk image) are reconstructed into original file system requests. Knowledge of the original file system requests is utilized for optimizing operations on the disk image, such as prefetching or caching metadata.

In one embodiment, the mapping information is stored in a memory, and if the program or node fails, a new mapping is generated. A database may store this information to handle failures, such that on restart the mapping information is saved on disk.

In the description herein, an original file request means the original file system request in the virtual machine (guest or host system), which is different from the file system in which the disk image (which contains the guest file system) is stored.

One embodiment of the invention provides a system for reconstructing virtual machine file system requests at the storage system level. As such, the storage system has knowledge of the operating system information about the data to be stored. This allows the file system of the storage system to view disk images as transparent objects that can be optimized.

In one implementation, the invention makes data caching and prefetching more accurate and effective, reducing cache pollution and increasing the cache-hit ratio. Further, unlike conventional approaches where metadata requests to the disk image are converted to I/O requests and all information regarding directories and their directory entries are lost, according to embodiments of the invention the entire disk image file system metadata structure is known and can be effectively navigated. Embodiments of the invention are useful with network attached storage (NAS) protocols.

According to an embodiment of the invention, a system for introspecting and analyzing disk image files in a storage server places disk image file on storage devices, and reconstructs and optimizes requests in relation to file system stored by the disk image (e.g., virtual machine file system requests). Information about server disk image type is used to transform storage server file system (i.e., server) requests to guest file system requests. For example:

read (disk_image_file, offset, len) where offset and len are relative the disk image file is reconstructed as getattr(x) where x is a file/inode in the virtual machine's file system, or read (file_within_disk_image, offset, len) where the offset and len are now relative to the file stored by the virtual machine's file system, etc.

Further, information about server disk image type is used to arrange bytes on a server disk subsystem. The server disk image type can be any well structured format (e.g., file system (fs), DB). As such, the storage system utilizes the same disk image information as the guest operating system to optimize I/O access requests. This increases accuracy of prefetching, prioritizing metadata, and performing per-file data prefetching. In one example, a file system block in the disk image is stored across multiple file system blocks in the storage system. In this case, the layout of the disk image may be changed such that all of its file system blocks are stored in a single file system block in the storage system. This would reduce the amount of read-modify-write in the storage system and increase performance. Further, the type of file system in the disk image may be automatically determined, or may be specified by a user.

FIG. 1 shows a block diagram of an information technology system 10 according to an embodiment of the invention. The system 10 comprises a virtual machine (VM) 11 including a hypervisor, and a storage system 12, such as a NAS system, according to an embodiment of the invention. The storage system 12 includes a disk image introspection system 13, according to an embodiment of the invention, wherein the disk image introspection system 13 comprises an I/O request analyzer module 14 and an introspection module 14A comprising a disk image analyzer module 15, a layout manager module 16, a layout generator module 17, and a prefetch manager module 18.

In one embodiment, the I/O request analyzer 14 uses the disk image analyzer 15 to map incoming I/O requests from the VM hypervisor 11 to a superblock, file, inode, dentry, indirect block, or data block. For example, the disk image analyzer 15 uses a Linux VFS interface to understand a disk image layout. The layout manager 16 manages mapping of disk image byte ranges to the storage system file layout 19. The prefetch manager 18 uses the disk image analyzer and the I/O request analyzer results to determine data to prefetch in the disk image. The layout generator 17 uses the disk image analyzer results to divide up the disk image and create a layout for the disk image in the storage system 12 (FIG. 3B).

In one embodiment of the invention, file system requests in a storage system are reconstructed as follows. I/O request are received for a disk image in the storage system, and introspection on the disk image is performed to reverse engineer the I/O request and determine the original file system request. A set of one or more I/O requests are determined to perform on the storage system to satisfy the original I/O request to the disk image. A response is provided to the original I/O request. It is determined if any additional I/O requests are likely to be performed to the storage system, and if so, the results are cached to optimize possible future I/O requests to the disk image.

Figure 2:
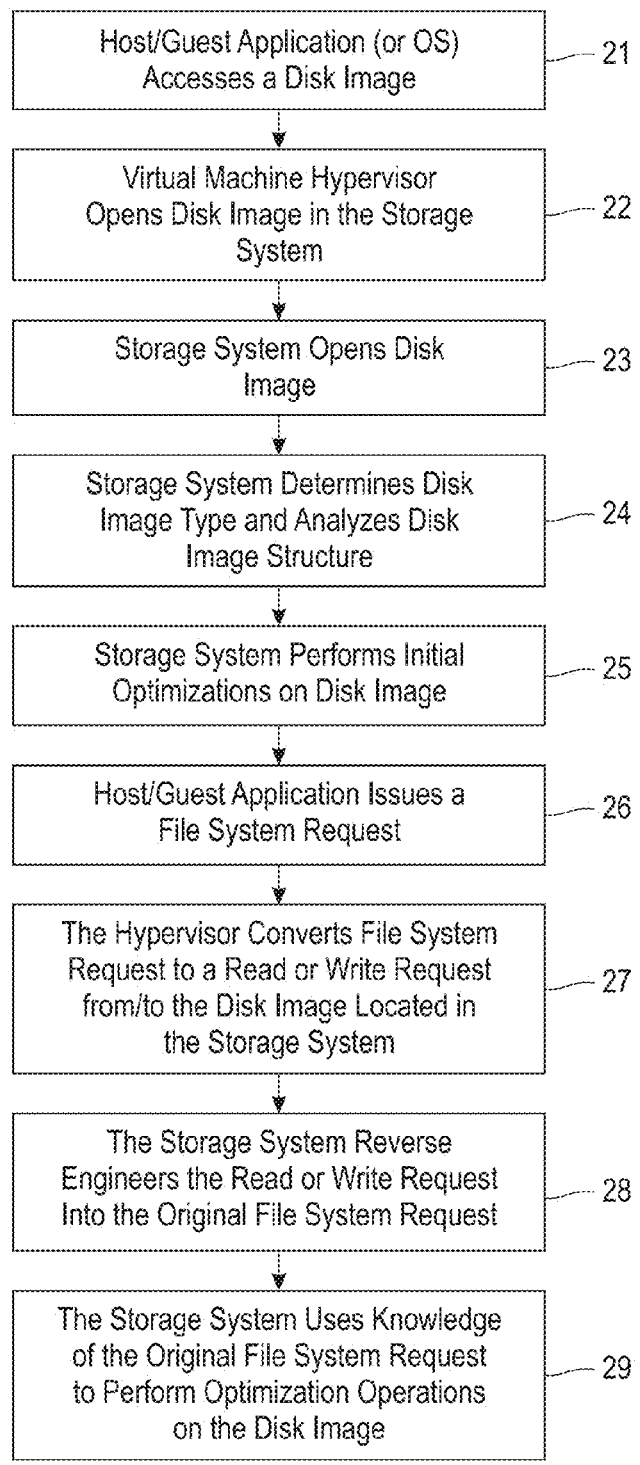
FIG. 2 shows a process for disk image introspection for a storage system, according to an embodiment of the invention.

FIG. 2 shows a process 20 that utilizes disk image introspection for data prefetching, according to an embodiment of the invention, comprising:

Process block 21: Guest application (or OS) accesses a disk image DI1.

Process block 22: Virtual machine (guest system) hypervisor opens disk image DI1 in the storage system.

Process block 23: Storage system opens disk image.

Process block 24: Storage system determines disk image type (manually or automatically) and analyzes disk image structure by reverse engineering using a file system specific module.

Process block 25: Storage system performs initial optimizations on disk image (e.g., prefetch all metadata information into a cache).

Process block 26: Guest system application issues a file system request.

Process block 27: The hypervisor converts file system request to a read or write request from/to the disk image located in the storage system.

Process block 28: The storage system reverse engineers the read or write request into the original file system request. This is accomplished by using a file system module specific for the type of file system located in the disk image (e.g., a read of bytes 10 to 20 could be converted into a lookup request for an inode).

Process block 29: The storage system uses knowledge of the original file system request to perform optimization operations on the disk image. File system specific optimizations (from file system module in process block 23 above) are leveraged. An example for an ext3 disk image involves leveraging an ext3 readahead algorithm to determine prefetching strategy. Further, storage system specific optimizations are performed. For example, for a lookup of an inode, a read request of all dentries in that directory is performed.

The process blocks 26-29 in FIG. 2 are repeated for additional incoming requests.

Figure 3A:
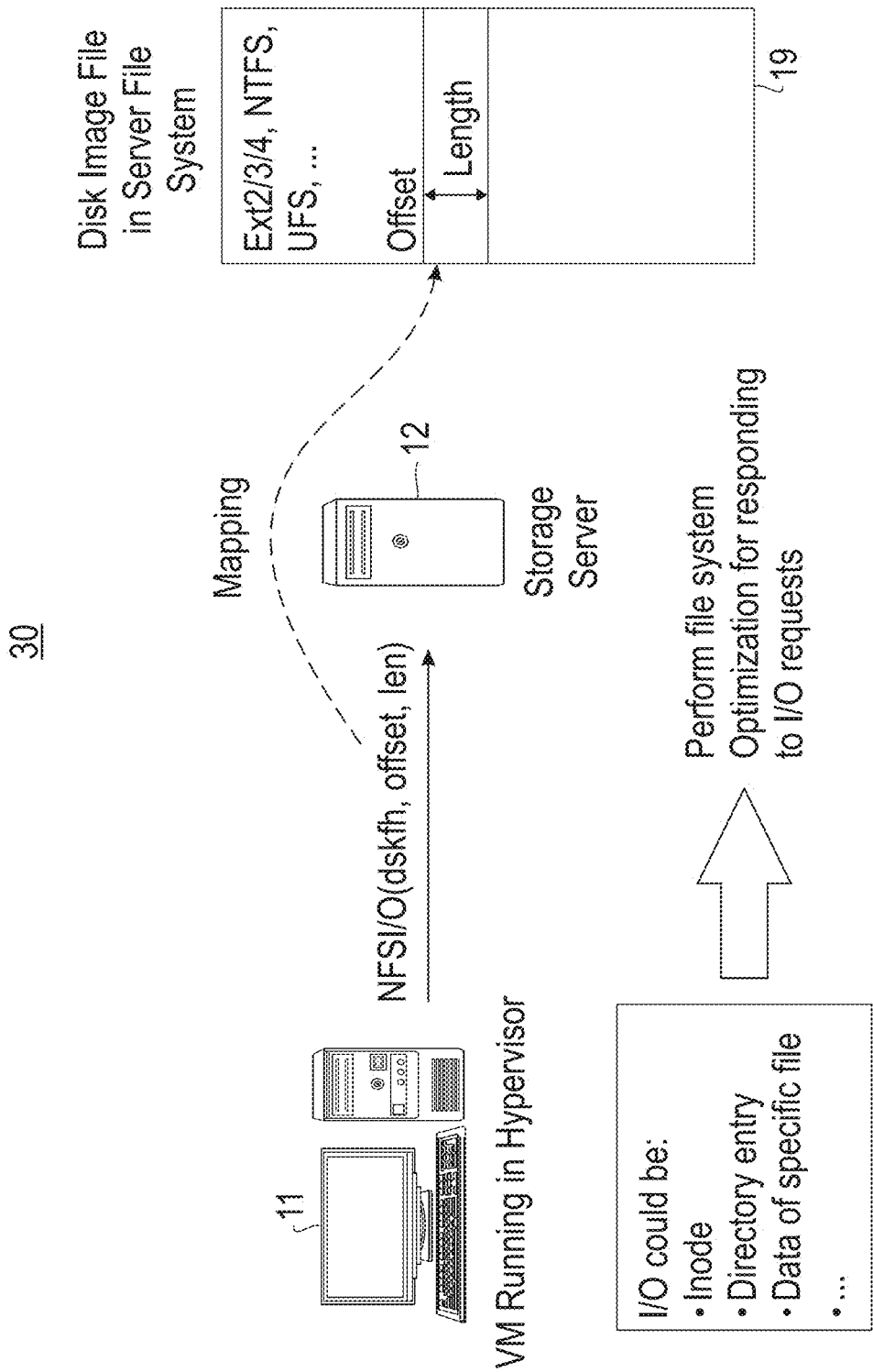
FIG. 3A shows a process for disk image layout in a storage system, according to an embodiment of the invention.
Figure 3B:
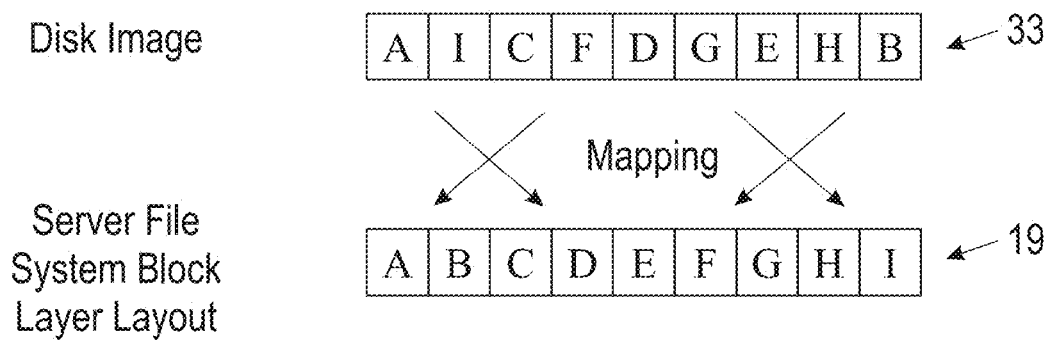
FIG. 3B shows an example mapping of the disk image blocks in the file system in the storage system, according to an embodiment of the invention.

FIG. 3A illustrates a process 30 for laying out a disk image in a file system of a storage system (e.g., storage server according to an embodiment of the invention). Type-specific introspection on the disk image is performed. FIG. 3A illustrates the runtime aspects of said reverse engineering process block 28 in FIG. 2, by converting I/O requests to the disk image into the original file system request. FIG. 3B shows an example mapping 31 of blocks of disk image 33 and the blocks of file layout 19 in the file system in the storage system 12.

Based upon the results of the introspection, disk image data ranges are mapped to blocks within the file system in the storage server 12. A mapping of disk image data ranges to blocks in the file system in the storage server is maintained in the storage server 12 for facilitating I/O requests.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
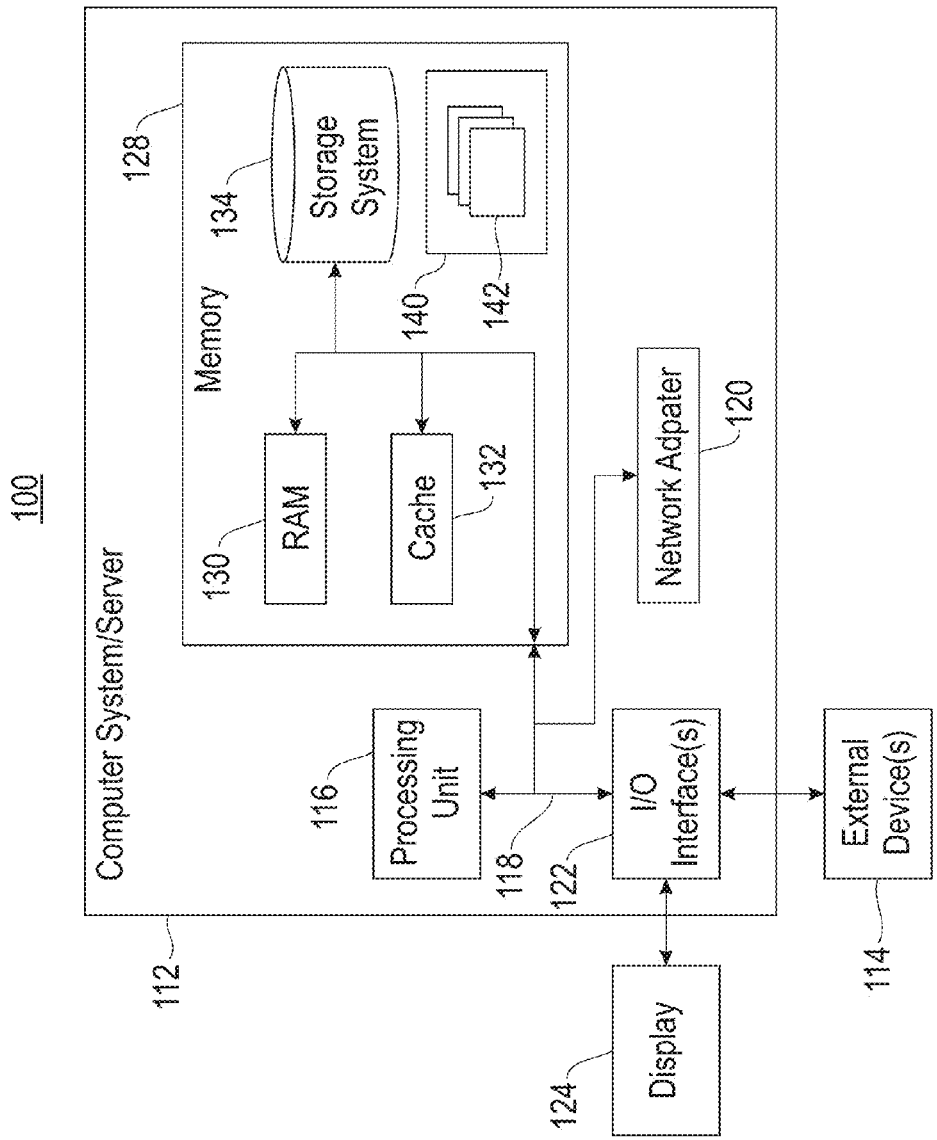
FIG. 4 depicts a cloud computing node according to an embodiment of the present invention.

Referring now to FIG. 4, a schematic of an example of a cloud computing node implementing an embodiment of the invention is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system executable instructions, such as program modules, being executed by a computer system.

Generally, program modules may include routines, programs, objects, components, logic, data structures, and so on that perform particular tasks or implement particular abstract data types.

Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 112 in cloud computing node 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein. Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 5:
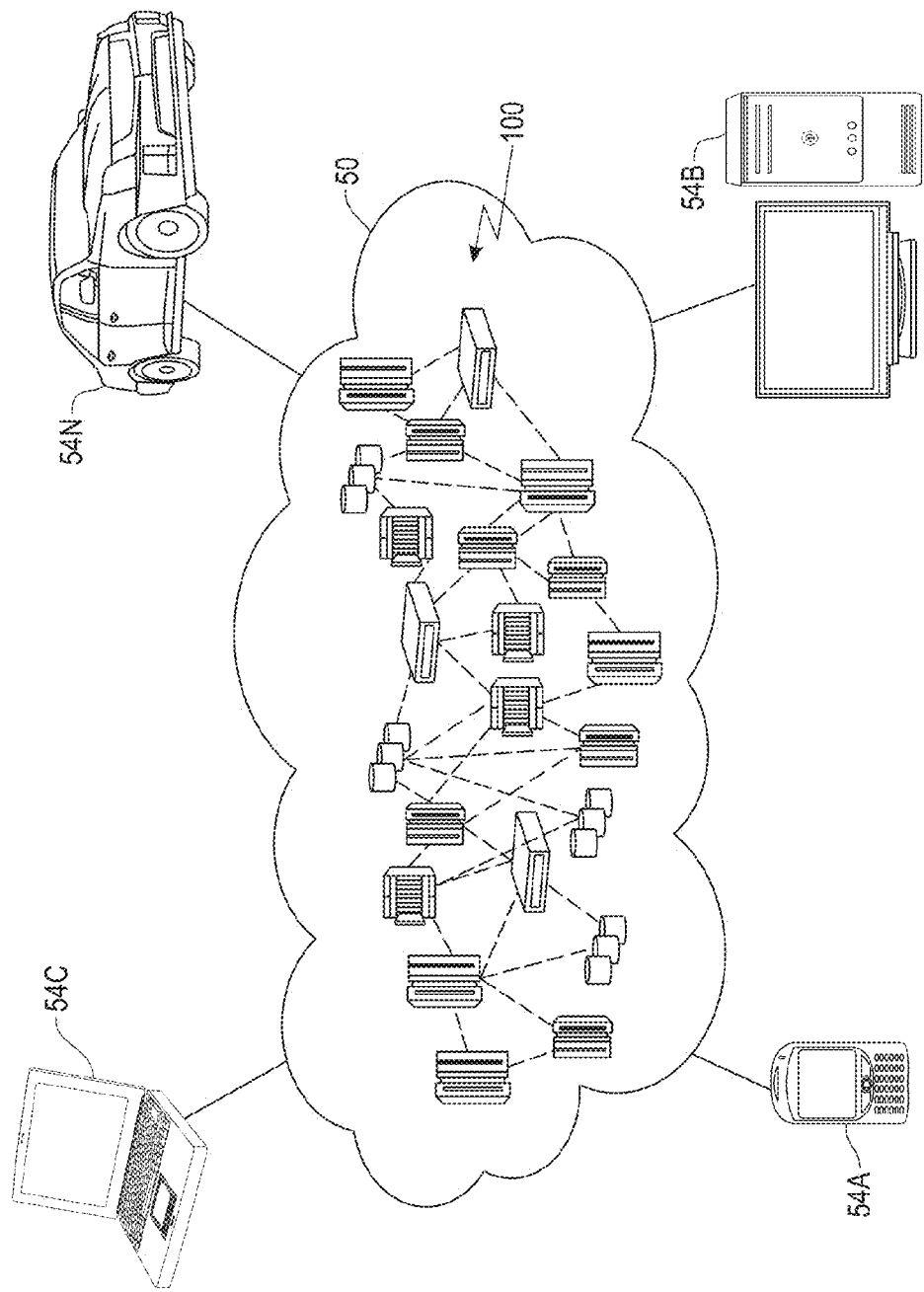
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
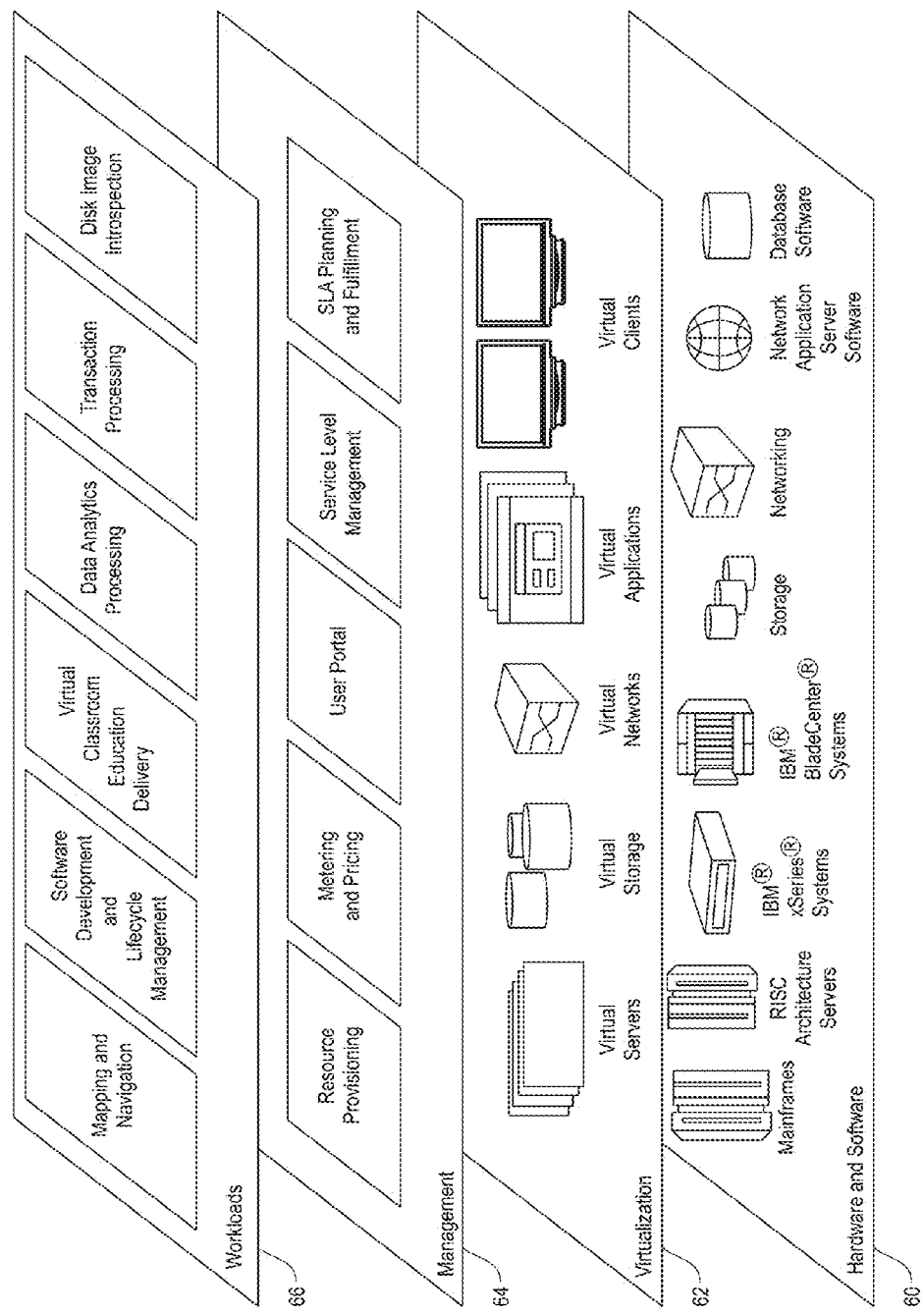
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described herein. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and disk image introspection, according to embodiments of the invention.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for virtual machine disk image access in a storage system, comprising:
   prefetching a disk image metadata structure;
   receiving an input/output (I/O) request to the disk image; and
   in response to the I/O request, reconstructing a file system request by laying out the disk image, performing type-specific introspection on the disk image comprising determining disk image type and using a file system specific process for a particular type of file system located in the disk image for analyzing the disk image structure, wherein the I/O request is converted to an original file system request based on the disk image metadata structure, and a read or write request is converted to a lookup request.

2. The method of claim 1, wherein the entire information of the disk image metadata structure is used to transform storage server file system requests to guest file system requests.

3. The method of claim 1, wherein performing type-specific introspection improves prefetching of data accuracy, reduces cache pollution and increases a cache-hit ratio based on navigation of entire information of the disk image metadata structure.

4. The method of claim 1, further comprising:
mapping data ranges in the disk image to blocks or files within the file system based on results of the introspection.

5. The method of claim 4, further comprising:
determining one or more I/O requests to perform on the file system to satisfy the original I/O request to the disk image.

6. The method of claim 1, further comprising:
determining one or more I/O requests to perform, and caching all of the prefetched disk image metadata structure information to optimize I/O requests to the disk image.

7. The method of claim 1, further comprising:
analyzing the disk image to identify a file system of the disk image.

8. The method of claim 1, further comprising:
reconstructing a data modification request to the disk image into an original file system request; and
performing data access optimization operations on the disk image.

9. The method of claim 1, wherein introspection on the disk image determines an original file system request and enables unilaterally provisioning computing capabilities.

10. A system, comprising:
a memory storing instructions;
one or more processors configured to execute the instructions to perform operations including:
a virtual machine process configured to access a disk image in a storage system, the storage system comprising:
a prefetch operation configured to access a disk image metadata structure for the storage system;
an input/output (I/O) operation configured to receive an I/O request to the disk image in a file system of the storage system;
a layout process configured to lay out the disk image in the file system of the storage system; and
an introspection process configured to reconstruct a file system request in response to the I/O request, to perform type-specific introspection on the disk image comprising: determining disk image type, use a file system specific process for a particular type of file system located in the disk image to analyze the disk image structure, wherein the I/O request is converted to an original file system request based on the disk image metadata structure, and a read or write request is converted to a lookup request.

11. The system of claim 10, wherein:
the entire information of the disk image metadata structure is used to transform storage server file system requests to guest file system requests; and
type-specific introspection improves prefetching of data accuracy, reduces cache pollution and increases a cache-hit ratio based on navigation of entire information of the disk image metadata structure.

12. The system of claim 10, wherein the introspection process is configured to determine one or more I/O requests to perform on the file system in the storage system to satisfy an original I/O request to the disk image, and to perform reverse engineering on the I/O request and determine the original I/O request.

13. The system of claim 12, wherein:
the introspection process is configured to respond to the original I/O request to the disk image, and based upon results of the introspection, data ranges in the disk image are mapped to blocks or files within the file system.

14. The system of claim 10, wherein:
the introspection process reconstructs a data modification request to the disk image into an original file system request, and performs data access optimization operations on the disk image.

15. The system of claim 14, wherein:
the introspection process determines one or more I/O requests to perform to the file system in the storage system, and caches all of the prefetched disk image file system metadata structure information of the storage system for optimizing I/O requests to the disk image.

16. The system of claim 13, wherein:
the introspection process is configured to analyze the disk image in the storage system to identify a file system of the disk image, and to maintain a mapping of disk image data ranges to blocks or files in the file system for responding to further I/O requests, and the mapping is updated upon a write occurring on the disk image.

17. A computer program product for virtual machine disk image access in a storage system, the computer program product comprising a computer readable storage device having program instructions embodied therewith, the program instructions executable by a processor to cause the processor to:
prefetch, by the processor, a disk image metadata structure;
receive, by the processor, an input/output (I/O) request to the disk image; and
in response to the I/O request, reconstruct, by the processor, a file system request by laying out the disk image, performing type-specific introspection on the disk image comprising determining disk image type and using a file system specific process for a particular type of file system located in the disk image for analyzing the disk image structure, wherein the I/O request is converted to an original file system request based on the disk image metadata structure and a read or write request is converted to a lookup request.

18. The computer program product of claim 17, wherein the entire information of the disk image metadata structure is used to transform storage server file system requests to guest file system requests.

19. The computer program product of claim 17, wherein performing type-specific introspection improves prefetching of data accuracy, reduces cache pollution and increases a cache-hit ratio based on navigation of entire information of the disk image metadata structure.

20. The computer program product of claim 17, wherein performing type-specific introspection further causes the processor to:
map, by the processor, data ranges in the disk image to blocks or files within the file system based on results of the introspection.

* * * * *